Jan. 17, 1961  W. P. EWALD  2,968,217
LENS ADJUSTING MEANS FOR STEREO PROJECTORS
Filed April 9, 1957  3 Sheets-Sheet 1

WILLIAM P. EWALD
INVENTOR.

BY Daniel I. Mayne
F. M. Emerson Holmes
ATTORNEYS

Jan. 17, 1961 W. P. EWALD 2,968,217
LENS ADJUSTING MEANS FOR STEREO PROJECTORS
Filed April 9, 1957 3 Sheets-Sheet 2

WILLIAM P. EWALD
INVENTOR.

BY

ATTORNEYS

Jan. 17, 1961 W. P. EWALD 2,968,217
LENS ADJUSTING MEANS FOR STEREO PROJECTORS
Filed April 9, 1957 3 Sheets-Sheet 3

WILLIAM P. EWALD
INVENTOR.

BY

ATTORNEYS

United States Patent Office 2,968,217
Patented Jan. 17, 1961

2,968,217

LENS ADJUSTING MEANS FOR STEREO PROJECTORS

William P. Ewald, Rochester, N.Y., assignor to Eastman Kodak Company, Rochester, N.Y., a corporation of New Jersey Filed Apr. 9, 1957, Ser. No. 651,668

1 Claim. (Cl. 88—26)

This invention relates to optical systems for the projection of superimposed images from a pair of stereo transparencies such as made with a twin lens camera. It relates particularly to the lens adjusting means for such a projector. Reference is made to my cofiled application Serial No. 651,669, now Patent No. 2,898,806, issued Aug. 11, 1959, on a polarizing filter for a stereo projector.

It is well known that due to film wandering in the camera or errors in mounting the transparencies, or merely in order to permit changing the convergence or divergence when viewing, it is usually necessary to adjust one of the lens systems of a stereo projector relative to the other, particularly in order to register some particular object in the scene on the screen and sometimes to focus one of the lenses relative to the other. It is very disconcerting for an observer to look at a stereo picture in which one of the images is in focus and the other one out, and particularly when the images are not registered both vertically and horizontally on the screen. Of course, objects at different distances from the camera subtend different included angles and therefore may not be registered simultaneously. This difference is the source of the stereo effect. Nevertheless, it is necessary to have proper vertical registration, within known tolerances, and to have proper horizontal registration for the object which is to appear exactly at the screen, again within known tolerances.

During the projection of two misaligned images, eyestrain is experienced when one eye sees only one image and the other eye sees only the other image. If both eyes see both images there is no stereo effect, but at least there is no eyestrain. The observer merely sees two images out of register. It looks like a double exposure. According to the present invention, the observer sees such images and corrects the registration thereof before inserting the anaglyph filters or turning them to the anaglyph position to produce the stereo effect. By the time the stereo effect is presented to the observers, the sources of eyestrain have been removed.

The object of the present invention is to provide a simple mechanism for performing the above adjustments rapidly, usually in less than one second's time and without confusion. According to the invention, registration is provided by a toggle rod or joy stick which moves one of the images both horizontally and vertically into proper registration with the other in the manner which appears most natural to the operator of the toggle rod.

Similarly, the focusing rod for focusing both of the lenses is arranged for a slight side-ways adjustment to change the focus of one lens relative to the other, again in the manner which appears most natural. The preferred form of the latter feature insures that the sideways movement of the focusing rod affects only the focus of one of the lenses.

The various advantages of the invention and the operation thereof will be more fully understood from the following description when read in connection with the accompanying drawing in which.

Figure 1:
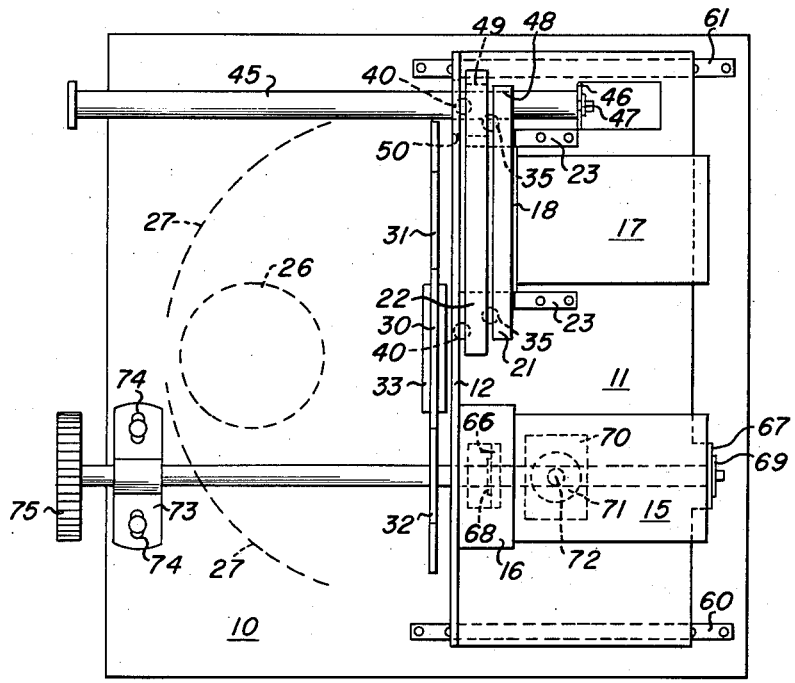
Fig. 1 is a plan view of the essential features of the invention.
Figure 2:
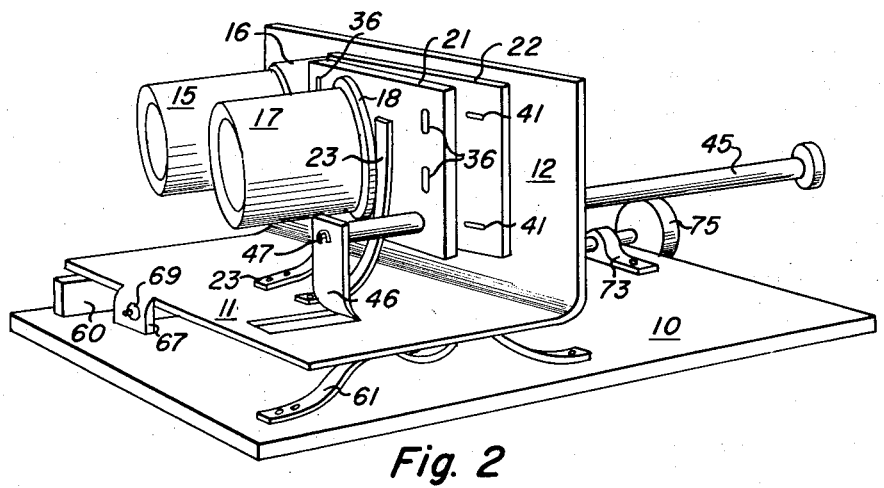
Fig. 2 is a perspective view from one side showing the simple registration adjustment feature.
Figure 3:
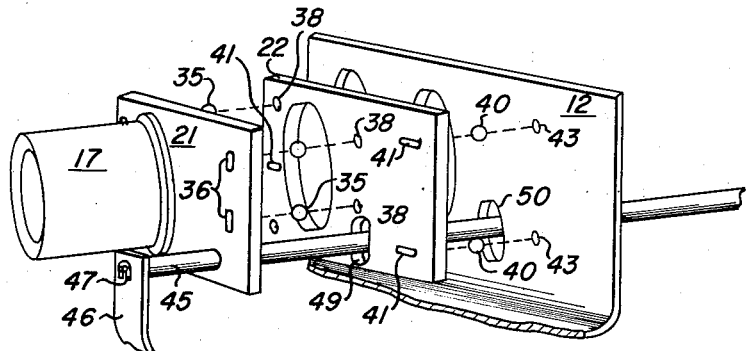
Fig. 3 is an exploded perspective view of this feature.
Figure 4:
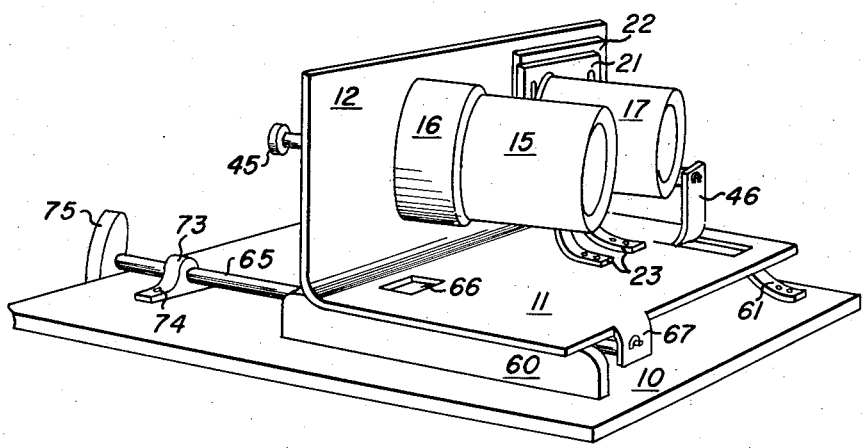
Fig. 4 is a perspective view from the other side particularly showing the focusing mechanism.
Figure 5:
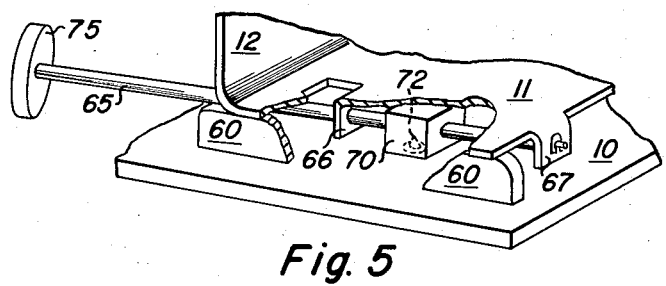
Fig. 5 is a similar perspective view partly broken away to show details of the focusing mechanism.
Figure 6:
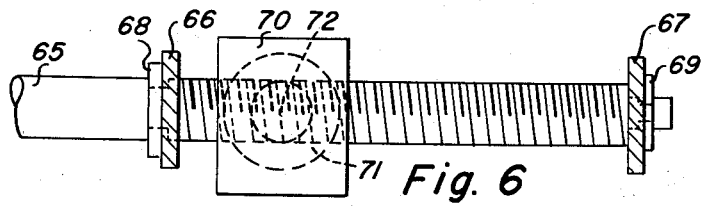
Figs. 6 and 7 are respectively horizontal and vertical sections of the focusing mechanism.
Figure 7:
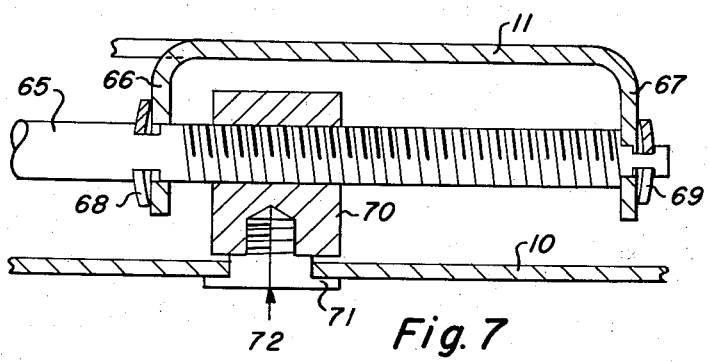

The registering feature will be described in connection with Figs. 1, 2 and 3. A base plate 10 which is usually the bottom of the projector housing carries a lens support 11 about 1 inch above the base plate. The support has a horizontal portion 11 and a vertical wall 12 at the rear thereof. One of the lenses 15 of the stereo projector is attached by a ring 16 directly to the vertical portion 12 of the support 11.

The other lens 17 is attached by a ring 18 to a plate 21 and by movable plates 21 and 22 is coupled to the rear wall 12 of the support. The movable plates 21 and 22 are held in contact with wall 12 by spring members 23. Light from a lamp 26 is reflected and focused by elliptical mirrors 27 through stereo transparencies 31 and 32 carried in a suitable mount 30 such as the cardboard mount commonly supplied for such stereo transparencies. If the views 31 and 32 are registered in the mount 30 in exactly the same way as the previous pair projected by this instrument, there is no need to change the position of the lenses 15 and 17.

In general, however, the transparency 31 is too high, too low or too far to one side. It may also be out of focus but this will be discussed below. In order to provide proper register the lens 17 is moved transversely either horizontally or vertically or both until the image of the transparency 31 is properly registered on the screen with respect to the image of the transparency 32. Vertical slots 36 in the movable plate 21 engage ball bearings 35 which rest in holes 38 in the plate 22, which holes are slightly smaller in diameter than the balls 35. Thus, the plate 21 is constrained to move only vertically relative to the plate 22. This is perhaps best seen in Figs. 2 and 3.

Similarly, narrow slots 41 in the plate 22 engage ball bearings 40 whose diameter is greater than the width of slots 41. The balls 40 rest in holes 43 in the wall 12 of the support. Since the slots 41 are horizontal, the plate 22 is constrained to move only horizontally relative to the wall 12. Since both the plates 21 and 22 can move, the lens 17 can move in any direction transverse to its axis, but does so without rotating about any axis.

A part 46 of the base plate 11 is cut out and turned up to form a vertical lug which acts as a pivot point for a toggle rod or joy stick 45. The rod 45 extends through a hole in the lug 46 and is clamped thereto by a U-shaped spring 47 engaging grooves in the rod 45. The rod 45 is free to turn about the universal pivot at the point 47. The rod 45 engages the movable plate 21 relatively tightly so that any movement of the rod 45 is transmitted immediately to the plate 21. Raising the rod 45 causes the plate 21 to move relative to the plate 22. Moving the rod 45 horizontally causes both the plates 21 and 22 to move horizontally relative to the wall 12. For convenience, the rod 45 extends to the rear of the projector and the pivot point is at the front end of the rod. This requires large holes in the plate 22 and the wall 12 to permit the rod 45 to move about its pivot. Of course, the rod 45 could extend forward and in this case, it would only reach the plate 21 and there would be no need for the holes in the plate 22 in the wall 12.

It is obvious that this arrangement is quite simple to assemble, the rod 45 being inserted after the movable plates are in place. Nevertheless, this arrangement provides precise adjustment of the lens 17 transversely and requires only a single, natural, movement of the rod 45 to obtain both horizontal and vertical adjustment simultaneously.

The transparency holder 30 is held on a support 33 carried by the base 10. A more elaborate form of support is shown in my copending application mentioned above. The present invention is not concerned with the particular form of slide support but merely with the manner of moving the lenses relative thereto. The whole plate or lens support 11 is movable relative to the base 10 to permit focusing of the lenses. Normally both lenses are focused simultaneously. This is accomplished by turning a rod 65 which engages downwardly turned lugs 66 and 67 on the support 11. This is best seen in Figs. 1 and 4 to 7. The rod is fastened so as not to move longitudinally relative to lugs 66 and 67 to which it is attached by U-shaped spring washers 68 and 69 engaging grooves in the rod 65. Also the rod 65 is screw threaded through a nut 70 fastened (rotatably) to the base 10. Thus, turning the rod 65 causes it to move relative to the nut 70 (and base 10) and to carry the lugs 66 and 67 with it. This moves the support 11 which rests on an upright member 60 and a spring member 61 fastened to the base 10. The nut 70 is free to swivel about the point 72 and is fastened to the base 10 by a threaded member 71. The rear end of the rod 65 is carried in a bearing 73 having transverse slots 74 through which the bearing is fastened to the base 10. Thus, the rod 65 is permitted a slight swinging or turning motion about the pivot 72. Both rotation and turning of the rod 65 is obtained through a knob 75 on the outer end thereof.

Normal rotation of the rod 65 focuses both lenses. Turning the rod about the pivot 72 will change the focus only of the lens 17. The focus of the lens 15 is unchanged since the axis of rotation passing through the point 72 also passes through one of the nodal points of the lens 15. The system also works when this latter feature is not present (i.e. when the pivot point is not under a nodal point), but observers usually find that they prefer to focus one of the lenses perfectly and then to focus the other one a slight additional amount, rather than to change the overall focus as the relative focus is adjusted.

The plate 11 is held away from the base 10 by the runner 60 and the spring 61 and urged toward the base 10 by the rod 65 engaging the lugs 66 and 67, the rod itself being held down by the nut 70 rotatably attached to the base 10.

I claim:

Lens adjusting means for a stereo projector comprising a pair of substantially parallel lenses with their axes horizontal, a vertical plate support for both lenses orthogonal to said axes, means attaching one of the lenses rigidly to said plate support, a first movable plate and a second movable plate both parallel to said plate support coupling the other lens to said plate support, means for attaching said other lens rigidly to said first plate, means for constraining the first movable plate to move only in one azimuth relative to the second movable plate, means for constraining the second movable plate to move relative to said plate support only in an azimuth approximately at right angles to first azimuth, said constraining means consisting of ball bearings between the two plates and between the second plate and said plate support, each ball engaging a round hole in one plate and a linear slot in the adjacent plate, a toggle rod extending through large apertures in the second movable plate and the plate support and through a closely fitting aperture in the first movable plate, and means rigidly attached to said plate support for universally pivotally supporting said toggle rod at a distance from the first movable plate.

References Cited in the file of this patent

UNITED STATES PATENTS

| | | |
|---|---|---|
| 1,060,128 | Roebuck | Apr. 29, 1913 |
| 1,169,161 | Ives | Jan. 25, 1916 |
| 2,297,532 | Brost et al. | Sept. 29, 1942 |
| 2,493,463 | Morgan et al. | Jan. 3, 1950 |
| 2,580,874 | Wottring | Jan. 1, 1952 |
| 2,598,573 | Lutes | May 27, 1952 |
| 2,612,818 | Jackson | Oct. 7, 1952 |
| 2,653,511 | Correa | Sept. 29, 1953 |
| 2,700,322 | Gruber | Jan. 25, 1955 |
| 2,914,985 | Badalich | Dec. 1, 1959 |

FOREIGN PATENTS

| | | |
|---|---|---|
| 622,816 | Great Britain | May 9, 1949 |
| 827,721 | Germany | Jan. 14, 1952 |